United States Patent [19]
Ferguson

[11] Patent Number: 5,419,250
[45] Date of Patent: May 30, 1995

[54] HAMBURGER DEGREASER

[76] Inventor: Jason Ferguson, 6000 W. 75th Dr., Arvada, Colo. 80003

[21] Appl. No.: 113,332

[22] Filed: Aug. 30, 1993

[51] Int. Cl.6 .................. A23N 1/00; A47J 19/00; B30B 9/06
[52] U.S. Cl. .................. 99/495; 99/349; 100/125; 100/266; 100/910
[58] Field of Search .................. 99/349, 495; 100/125, 100/131, 132, 234, 243, 266, 910

[56] References Cited

U.S. PATENT DOCUMENTS

| 769,015 | 8/1904 | Peirce | 100/132 |
| 782,618 | 2/1905 | Minyard | 100/125 |
| 1,469,114 | 9/1923 | Simpson | 100/125 |
| 1,535,769 | 4/1925 | Gallardo | 100/125 |
| 2,139,542 | 12/1938 | Finlayson | 100/125 |
| 2,173,733 | 9/1939 | Seybert | 100/125 |
| 2,433,815 | 12/1947 | Laforge | 100/243 |
| 4,580,577 | 4/1986 | O'Brien | 100/131 |
| 4,582,265 | 4/1986 | Petronelli | 100/234 |
| 4,958,557 | 9/1990 | Fiala | 100/125 |
| 5,320,031 | 6/1994 | Whitney | 99/495 |

FOREIGN PATENT DOCUMENTS

| 184579 | 5/1907 | Germany | 100/234 |
| 945182 | 7/1956 | Germany | 100/125 |
| 530310 | 7/1955 | Italy | 100/132 |

Primary Examiner—David A. Scherbel
Assistant Examiner—Randall E. Chin

[57] ABSTRACT

A device for removing excess grease and juices from a cooked hamburger. The device includes a container having a bottom and sidewall which extends upwardly to define a container cavity, the periphery of the sidewall defining a rim. A handle is coupled to the sidewall remote from the container cavity. A cover having a top and integral sidewall extends downwardly to define a cover cavity, the periphery of the sidewall defining a rim. A handle is coupled to the sidewall remote from the cover cavity, and a hole is disposed through the top wall. A coupling component is for coupling the cover to the container. A draining plate having a plurality of draining holes therethrough is adapted to rest on the rim of the container between the cover cavity and container cavity when the container is coupled to the cover. A pressing component is disposed through the hole of the container and located within the cover cavity and is used to press a cooked hamburger against the surface of the draining plate.

6 Claims, 4 Drawing Sheets

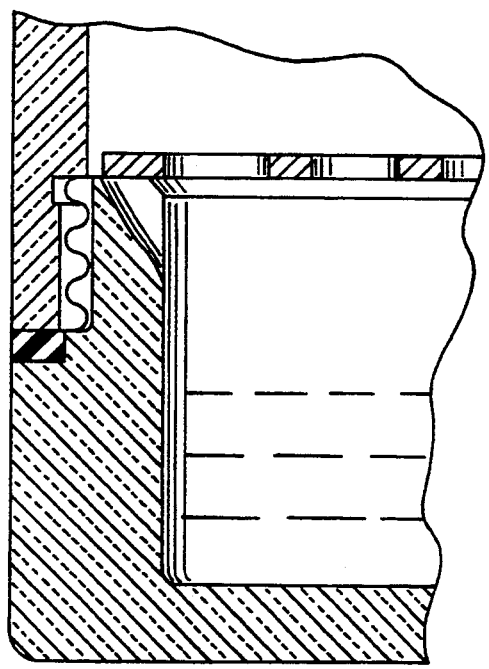
FIG. 3
FIG. 4
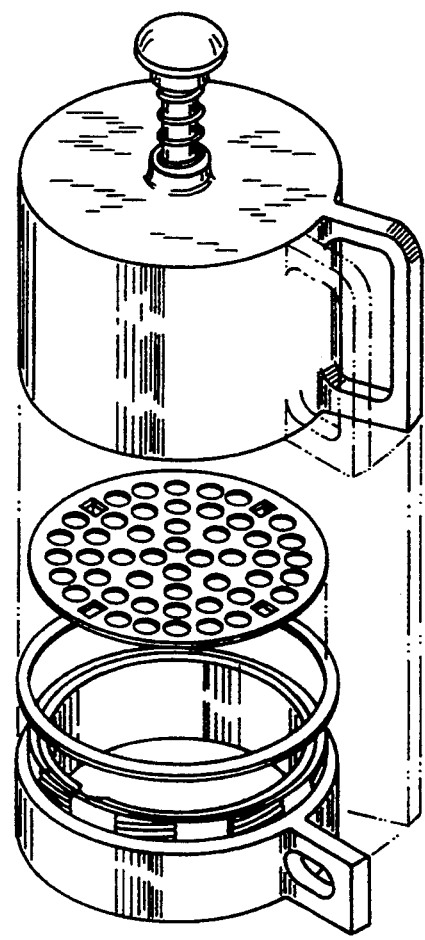

HAMBURGER DEGREASER

BACKGROUND OF THE INVENTION

1. Field of the Invention

The present invention relates to a hamburger degreaser and more particularly pertains to devices which may be used to remove grease and excess juices from cooked hamburgers.

2. Description of the Prior Art

The use of devices for removing excess juices from food is known in the prior art. More specifically, devices heretofore devised and utilized for the purpose of removing liquids from food are known to consist basically of familiar, expected and obvious structural configurations, notwithstanding the myriad of designs encompassed by the crowded prior art which have been developed for the fulfillment of countless objectives and requirements.

For example, food handling tongs illustrated in U.S. Pat. No. 4,904,009 to Kozlinski have upper and lower plates having a plurality of apertures therethrough, the plates pivotally mounted such that food placed between the plates may be squeezed to remove excess juices.

Another patent of interest is U.S. Pat. No. 4,635,538 to Polster which illustrates a hamburger press used for cooking. The device comprises a plate that is adapted to hold and cook a hamburger patty on a grill.

Other relevant patents include U.S. Pat. No. 4,106,401, U.S. Pat. No. 4,711,167 to Sano and U.S. Pat. No. 3,934,308 to Neri.

While these devices fulfill their respective, particular objective and requirements, the aforementioned patents do describe a device that has an integral plunging device for squeezing excess grease and juices from a cooked hamburger.

In this respect, the device according to the present invention substantially departs from the conventional concepts and designs of the prior art, and in doing so provides an apparatus primarily developed for the purpose of removing excess grease and juices from a cooked hamburger.

Therefore, it can be appreciated that there exists a need for a new device which can be used to remove excess grease and juices from a cooked hamburger. In this regard, the present invention substantially fulfills this need.

SUMMARY OF THE INVENTION

In the view of the foregoing disadvantages inherent in the known types of devices now present in the prior art, the present invention provides new construction wherein the same can be utilized to remove excess grease and juice from a cooked hamburger. As such, the general purpose of the present invention, which will be described subsequently in greater detail, is to provide a new and improved apparatus and method which has all the advantages of the prior art devices and none of the disadvantages.

To attain this, the present invention essentially comprises apparatus for removing the grease of noncooked hamburgers comprising, in combination, a container including a bottom wall having an interior surface and exterior surface, the container also including a sidewall having an interior surface and exterior surface, the sidewall coupled around the periphery of the bottom wall, the interior surface of the bottom wall and interior surface of the sidewall defining a container cavity and the periphery of the sidewall remote from the bottom wall defining a rim, the exterior surface of the sidewall adjacent to the rim having threads therearound, the container also including a handle coupled to the exterior surface of the sidewall; a cover including a top wall having an interior surface, exterior surface, and a cover hole centrally disposed therethrough, the cover also including a sidewall having an interior surface and exterior surface, the sidewall coupled around the periphery of the top wall, with the interior surface of the top wall and interior surface of the sidewall defining a cover cavity and the periphery of the sidewall remote from the top wall defining a rim, the interior surface of the sidewall adjacent to the rim having threads therearound, whereby coupling the threads of the cover and container, the container and cover define an integral unit, the cover also including a handle coupled to the exterior surface of the sidewall; a plunger including a plunging plate having an inner face and an outer face, the plate disposed in the cover cavity such that its periphery is adjacent to the interior surface of the sidewall and its interior surface is adjacent to the interior surface of the top wall, the plunger including a plunging handle, a plunging spring having a first end and a second end, and a plunging rod having a first end and a second end, the first end of the rod slidably disposed through the cover hole and coupled to the inner face of the plunging plate, the second end slidably disposed through the plunging spring and coupled to the plunging handle such that the first end of the spring is adjacent to the exterior of the top wall and the second end of the spring is adjacent to the handle, the spring adapted to urge the plunger upward such that the plunging plate is in a rest position adjacent to the interior surface of the top wall; and a draining plate having a top surface, a bottom surface, and a plurality of draining holes therethrough, the draining plate adapted to rest on the rim of the container when coupled to the cover such that the top surface of the draining plate is adjacent to the cover cavity and the bottom surface of the draining plate is adjacent to the container cavity, whereby when a cooked hamburger is placed on the top surface of the draining plate, with the cover is coupled to the container, and the plunging plate is pushed against the hamburger by downward pressure on the plunging handle, excess hamburger grease and juices drain through the draining holes and are collected in the container cavity.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scop of the invention in any way.

It is therefore an object of the present invention to provide a new device for removing excess grease and juices from hamburgers which may be easily and efficiently manufactured and marketed.

It is a further object of the present invention to provide a new device for removing excess grease and juices from hamburgers which is of durable and reliable construction.

An even further object of the present invention is to provide a new device for removing excess grease and juices from hamburgers which is susceptible of a low cost of manufacture with regard to both materials and labor, and which accordingly is then susceptible of low prices of sale to the consuming public, thereby making such economically available to the buying public.

Still yet another object of the present invention is to provide a new device for removing excess grease and juices from hamburgers which provides in the apparatuses and methods of the prior art some of the advantages thereof, while simultaneously overcoming some of the disadvantages normally associated therewith.

Still another object of the present invention is to provide a new device for removing excess grease and juices from hamburgers where the plunging device for squeezing excess grease and juice from hamburgers is integral to the device.

Yet another object of the present invention is to squeeze excess grease and juices from a cooked hamburger.

Even still another object of the present invention is to enhance the nutritional value and taste of hamburgers by removing undesirable fluids.

Lastly, another object of the invention is to provide a hamburger degreaser compressing container having a bottom wall, a side wall coupled around the wall and extending upwardly to define a container cavity with the periphery of the sidewall remote from the bottom wall defining a rim, and a handle coupled to sidewall remote from the container cavity, a cover having a top wall, a sidewall coupled around the top wall and extending upwards to define a cover cavity with the periphery of the sidewall remote from the top wall defining a rim, a handle coupled to the sidewall remote from the cover cavity; coupling means for removably coupling the cover to the container; a draining plate having a top surface, a bottom surface, and plurality of draining holes therethrough, the draining plate adapted to rest on the rim of the container between the cover cavity and container cavity when the cover is coupled to the container; and pressing means disposed through the cover hole for pressing a cooked hamburger against the top surface of the draining plate when the cover is coupled to the container, whereby excess hamburger grease and juices may drain through the draining holes and be collected in the container cavity.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an enlarged cross-sectional view of a portion of the device showing how the container and cover are coupled.

FIG. 4 is an exploded perspective view of the device and components of the prior figures.

DESCRIPTION OF THE PREFERRED EMBODIMENT

Figure 1:
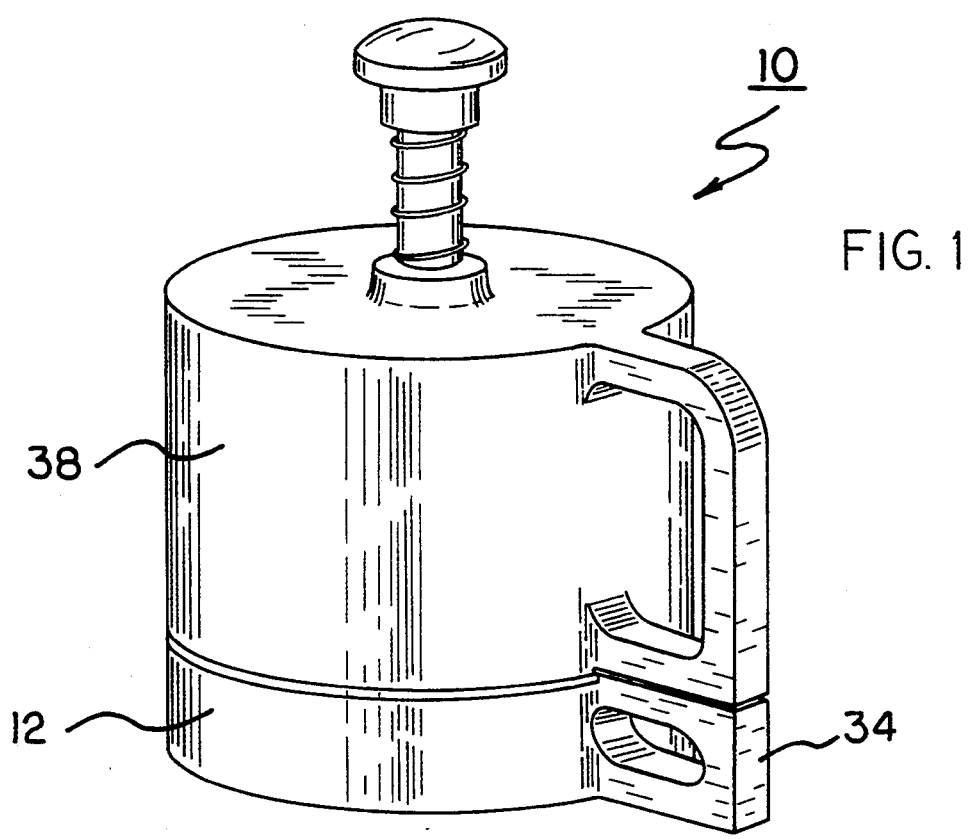
FIG. 1 is a perspective view of a hamburger degreaser constructed in accordance with the principles of the present invention.
Figure 2:
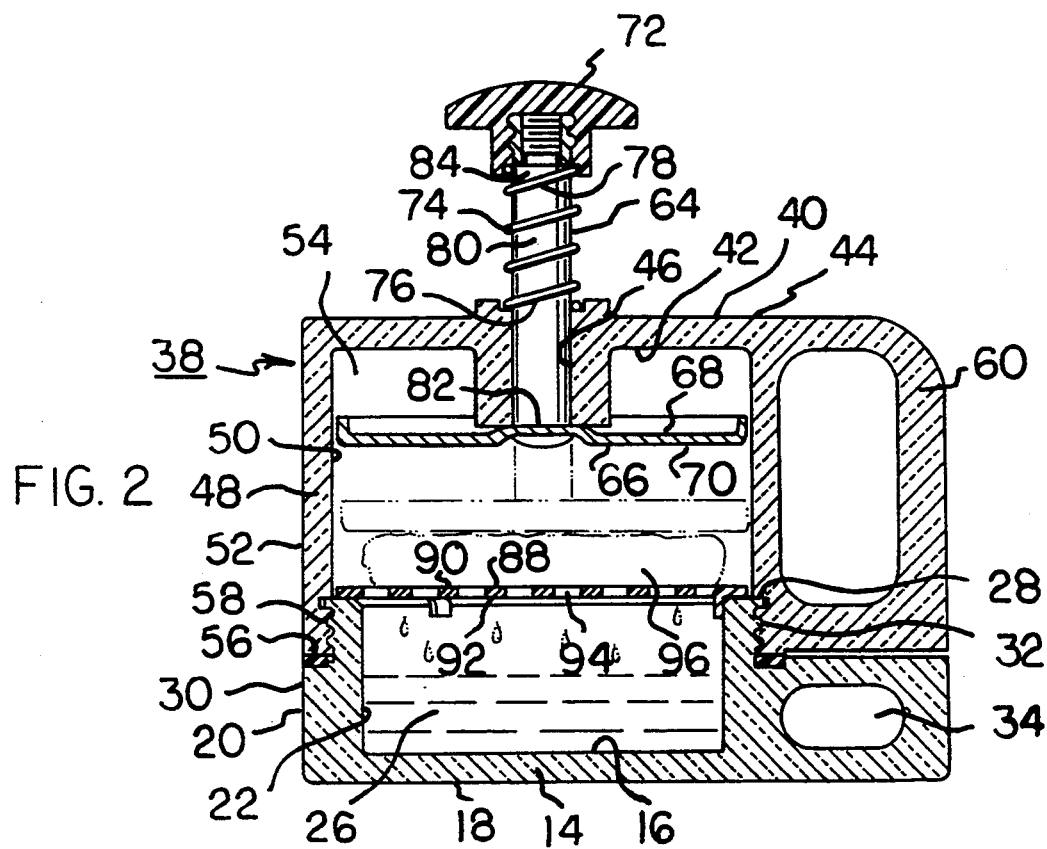
FIG. 2 is a cross-sectional view of the device illustrated in FIG. 1.

With reference now to the drawings, and in particular, to FIGS. 1-4 thereof, a new device for removing excess grease and juices from hamburgers embodying the principles and concepts of the present invention and generally designated by the reference number 10 will be described.

The hamburger degreaser 10 includes a container 12 comprising a bottom wall 14 having an interior surface 16 and exterior surface 18. A sidewall 20 is also included and has an interior surface 22 and exterior surface 30. The sidewall 20 is coupled around the periphery of the bottom wall 14. The interior surface 16 of the bottom wall 14 and the interior surface 22 of the sidewall 20 define a container cavity 26. The periphery of the sidewall 20 remote from the bottom wall 14 define a rim 28. The exterior surface 30 of the sidewall 20 adjacent to the rim 28 has threads 32 therearound. A handle 34 is coupled to the exterior surface 30 of the sidewall 20.

The degreaser device 10 includes a cover 38 which is comprised of a top wall 40 having an interior surface 42, exterior surface 44, and a cover hole 46 centrally disposed therethrough. A sidewall 48 has an interior surface 50 and exterior surface 52. The sidewall 48 is coupled around the periphery of the top wall 40. The interior surface 42 of the top wall 40 and the interior surface 50 of the sidewall 48 define a cover cavity 54. The periphery of the sidewall 48 remote from the top wall 40 defines a rim 56.

The interior surface 50 of the sidewall 48 adjacent to the rim 56 has threads 58 therearound. The threads 58 of the cover 38 and the threads of the container 20 function together for the removable coupling of the container 20 and cover 38 to define an integral unit during operation and use. A handle 60 is coupled to the exterior surface 52 of the sidewall 48.

Also included as a part of the degreaser device 10 is a plunger 64. The plunger 64 is comprised of a plunging plate 66 having an inner face 68 and an outer face 70. The plate 66 is disposed in the cover cavity 54 such that its periphery is adjacent to the interior surface 50 of the sidewall 48. Its interior surface 50 is also adjacent to the interior surface 42 of the top wall 40.

A plunging handle 72 with a plunging spring 74 is also provided. A rod 80 has a first end 82 and a second end 84. The first end 82 of the rod 80 slidably disposed through the cover hole 46 and is coupled to the inner face 68 of the plunging plate 66. The second end 84 is slidably disposed through the plunging spring 74 and coupled to the plunging handle 72 such that the first end 76 of the spring 74 is adjacent to the exterior surface 44 of the top wall 40 and the second end 78 of the spring 74 is adjacent to the handle 72. The spring 74 is adapted to urge the plunger 64 upward such that the plunging plate 66 is in a rest position adjacent to the interior surface 42 of the top wall 40.

The device 10 further includes a draining plate 88 having a top surface 90, a bottom surface 92, and a plurality of draining holes 94 therethrough. The draining plate 88 is adapted to rest atop the container 12 and on the rim 28 of the container 12 when coupled to the cover 38. In this manner the top surface 90 of the draining plate 88 is adjacent to the cover cavity 54 and the bottom surface 92 of the draining plate 88 is adjacent to the container cavity 26.

Because of the relationship of the parts as described above when a cooked hamburger 96 is placed on the top surface 90 of the draining plate 88 and when the cover 38 is coupled to the container 12 and when the plunging plate 66 is pushed against the hamburger by downward pressure on the plunging handle 72, excess hamburger grease and juices will drain through the draining holes 94 to be collected in the container cavity 26.

Figure 5:
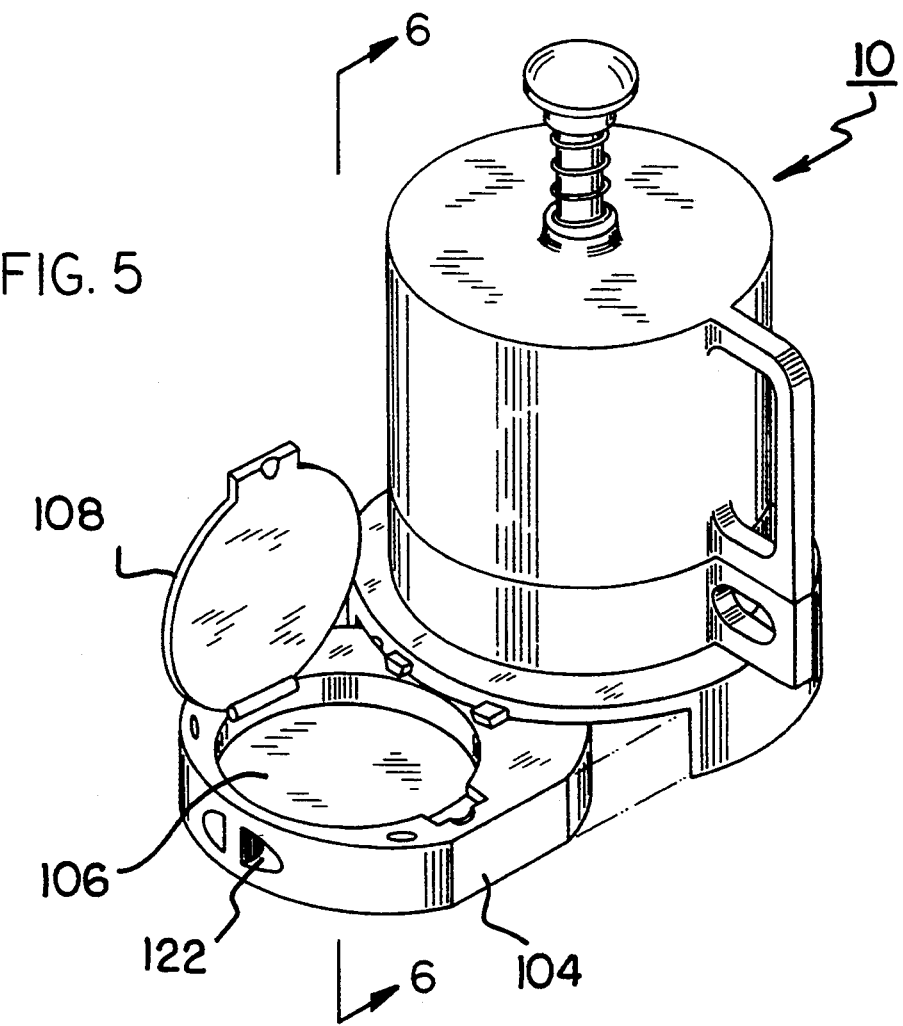
FIG. 5 is a perspective view of device constructed in accordance with an alternate embodiment of the invention and including a patty press.
Figure 6:
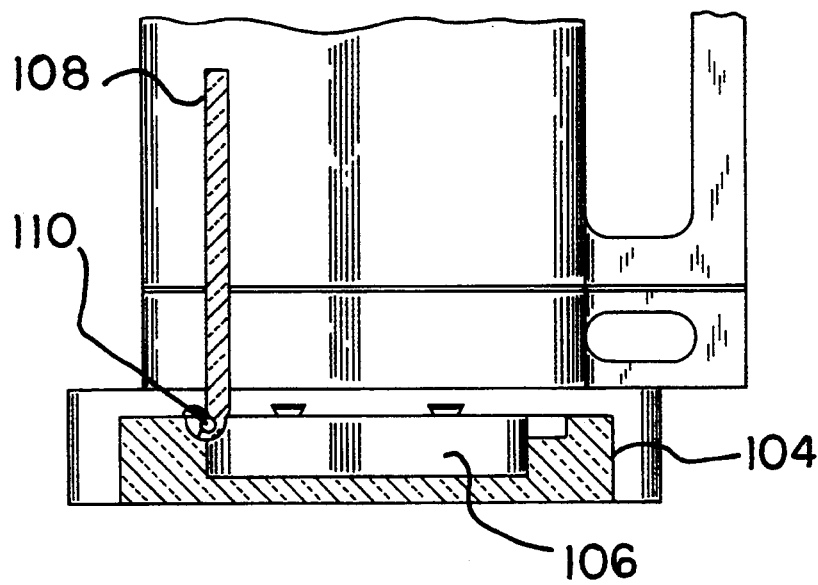
FIG. 6 is a sectional view taken along line 6—6 of FIG. 5 and illustrating how the patty press is coupled to the device.

Shown in FIGS. 5 and 6 is an alternate embodiment of the invention. The invention has a hamburger degreaser 102 essentially the same in most aspects to that hamburger degreaser 10 of FIGS. 1 through 4. In addition to the forgoing features, however, one additional feature is added. The additional feature is a slide out patty press 104 capable of pressing raw hamburger meat into a uniform size, diameter and thickness, in a repeatable fashion. The patty press includes the slide out member with a recess 106 essentially the same size as that of a hamburger to be made for cooking. A lid is provided in association with the patty press. Lid 108 is secured to the main portion of the patty press through a hinge 110. In this manner, with the patty press pulled out from its storage location beneath the degreaser 102, as shown in FIG. 5, the raw hamburger meat may be placed in the recess and the lid 108 pivoted down in to contact therewith a minimum amount of pressure will deform the raw hamburger meat into the proper size and shape of a hamburger to be cooked. In association therewith, pinch holes 122 are provided on the leading edge of the patty press 104 to assist in pulling out and pushing in the patty press with regard to its storage location.

Figure 7:
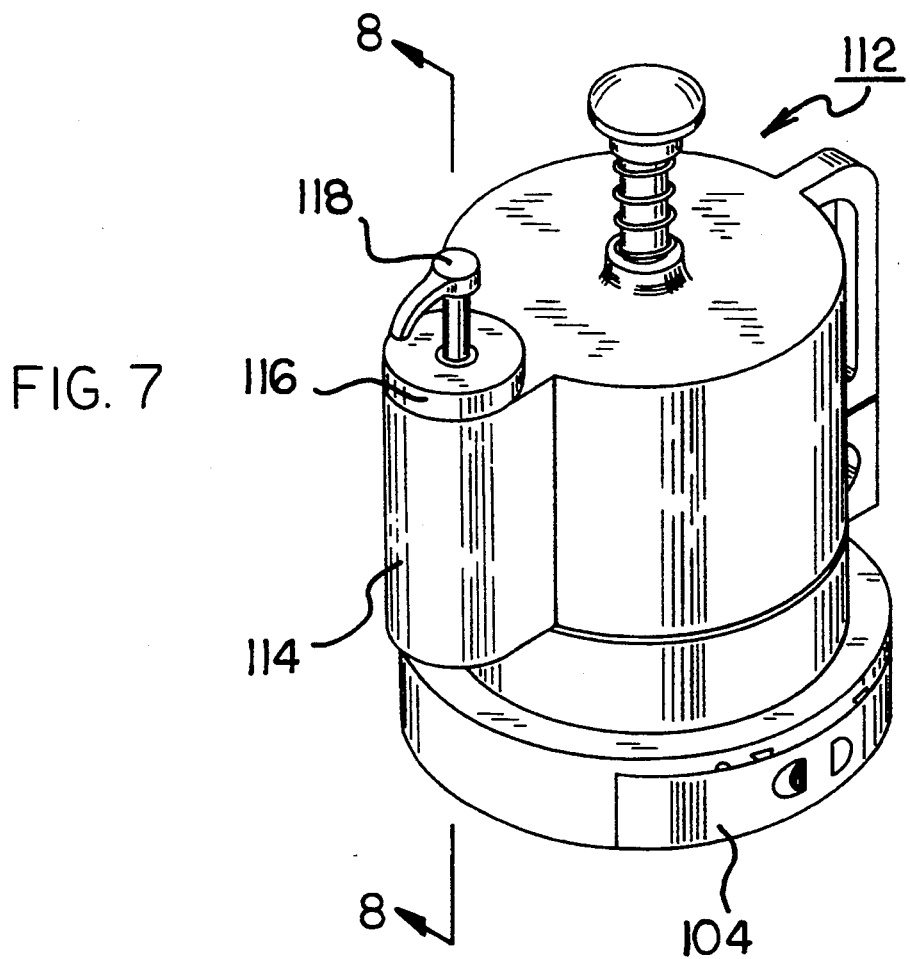
FIG. 7 is a perspective view of a device constructed in accordance with a further alternate embodiment of the invention with an integral condiment dispenser.
Figure 8:
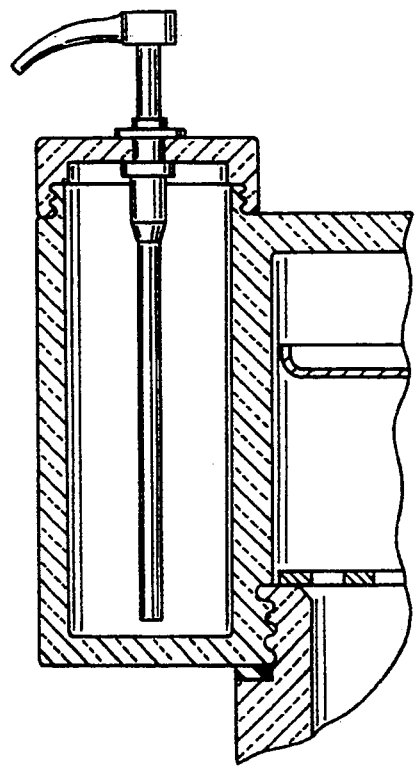
FIG. 8 is a sectional view of a portion of the device shown in FIG. 7 along line 8—8.

A last embodiment is illustrated in FIGS. 7 and 8. According to the last embodiment, a further modified hamburger degreaser is utilized. The hamburger degreaser of this embodiment is essentially the same as that of the prior embodiments, degreasers 102 and 10. This embodiment also includes a slide out patty press 104 as in the embodiment of FIGS. 5 and 6.

Supplementing the features of the prior embodiments, this hamburger degreaser includes a projection 114 extending outwardly from an upper side wall of the hamburger degreaser 112. The projection has a threaded upper end surrounding an opening. In association with that is a screw cap 116 adapted to selectively open and close the upper edge of the projection. A push pump 118 of conventional design may be utilized by a person wishing to provide a condiment to the hamburger. The pushing down of pump 118 functions in the conventional manner to raise the condiment, normally ketchup or mustard, stored in the projection. In this manner, extended utility is provided to the basic invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents amy be resorted to, falling within the scope of the invention.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

As to the manner of usage and operation of the present invention, the same should be apparent from the above description. Accordingly, no further discussion relating to the manner of usage and operation will be provided.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. Apparatus for removing the grease from cooked hamburgers comprising, in combination:
   a container including a bottom wall having an interior surface and exterior surface, the container also including a sidewall having an interior surface and exterior surface, the sidewall coupled around the periphery of the bottom wall, the interior surface of the bottom wall and interior surface of the sidewall defining a container cavity and the periphery of the sidewall remote from the bottom wall defining a rim, the exterior surface of the sidewall adjacent to the rim having threads therearound, the container also including a handle coupled to the exterior surface of the sidewall;

a cover including a top wall having an interior surface, exterior surface, and a cover hole centrally disposed therethrough, the cover also including a sidewall having an interior surface and exterior surface, the cover sidewall coupled around the periphery of the top wall, with the interior surface of the top wall and interior surface of the sidewall of the cover defining a cover cavity and the periphery of the sidewall remote from the top wall defining a rim, the interior surface of the sidewall of the cover adjacent to the rim of the cover having threads therearound, whereby the threads of the container and cover are coupled to define an integral unit, the cover also including a handle coupled to the exterior surface of the sidewall;

a plunger including a plunging plate having an inner face and an outer face, the plate disposed in the cover cavity such that its periphery is adjacent to the interior surface of the sidewall of the cover and its inner face is adjacent to the interior surface of the top wall, the plunger including a plunging handle, a plunging spring having a first end and a second end, a rod having a first end and a second end, the first end of the rod slidably disposed through the cover hole and coupled to the inner face of the plunging plate, the second end of the rod slidably disposed through the plunging spring and coupled to the plunging handle such that the first end of the spring is adjacent to the exterior surface of the top wall and the second end of the spring is adjacent to the plunging handle, the spring adapted to urge the plunger upward such that the plunging plate is in a rest position adjacent to the interior surface of the top wall; and a draining plate having a top surface, a bottom surface, and a plurality of draining holes therethrough, the draining plate adapted to rest on the rim of the container when coupled to the cover such that the top surface of the draining plate is adjacent to the cover cavity and the bottom surface of the draining plate is adjacent to the container cavity, whereby a cooked hamburger is placed on the top surface of the draining plate and the plunging plate is pushed against the hamburger by downward pressure on the plunging handle and excess hamburger grease drain through the draining holes and are collected in the container cavity.

2. A hamburger degreaser comprising:

a container having a bottom wall, a sidewall coupled around the wall and extending upwardly to define a container cavity with the periphery of the sidewall remote from the bottom wall defining a rim, and a handle coupled to the sidewall remote from the container cavity, a cover having a top wall with a cover hole centrally disposed therethrough, a sidewall coupled around the top wall and extending downwards to define a cover cavity with the periphery of the sidewall remote from the cover top wall defining a rim;

a handle coupled to the cover sidewall remote from the cover cavity;

coupling means for removably coupling the cover to the container;

a draining plate having a top surface, a bottom surface, and a plurality of draining holes therethrough, the draining plate resting atop the container between the cover cavity and container cavity and within the periphery of the cover sidewall when the cover is coupled to the container; and a plunger including a plunging plate disposed in the cover cavity, a rod extending through the cover hole and being coupled to the plunging plate with the plunging plate positioned for pressing a cooked hamburger against the top surface of the draining plate, whereby excess hamburger grease may drain through the draining holes and be collected in the container cavity.

3. The device as described in claim 2 and further comprising a means for dispensing condiments coupled to the sidewall of the cover.

4. The device as described in claim 3 wherein the means for dispensing comprises:

a jar integrally coupled to the cover sidewall remote from the cover cavity the jar having an opening; and a pump coupled to the opening of the jar for dispensing condiments therefrom.

5. The device as described in claim 2 and further comprising a patty press slidably coupled to the container adjacent to an exterior surface of the bottom wall.

6. The device as described in claim 5 wherein the patty press includes:

a patty container having a cavity for forming a hamburger therein;

a plate within the cavity for pressing the hamburger in the cavity; and a pivot pin pivotally connecting the plate to the patty container for relative movement therebetween when forming a hamburger.

* * * * *